June 8, 1954 A. A. HASSELBLAD ET AL 2,680,623
FEED COLLET
Filed Oct. 28, 1950

Inventor
AMBROSE A. HASSELBLAD
WALTER J. HASSELBLAD
By
Wheeler, Wheeler + Wheeler
Attorney Patented June 8, 1954

2,680,623

UNITED STATES PATENT OFFICE 2,680,623

FEED COLLET

Ambrose A. Hasselblad and Walter J. Hasselblad,
Green Bay, Wis.

Application October 28, 1950, Serial No. 192,738

9 Claims. (Cl. 279—46)

This invention relates to improvements in feed collets.

It is the primary object of the invention to provide an improved work feeding device for automatic screw machines and the like. In particular it is an object to provide within a minimum external cross section an adjustable feed collet readily variable as to friction and adapted to be effective upon a bar stock which approaches the maximum internal diameter of the pusher sleeve.

It is a further object of the invention to provide a novel pusher sleeve insert or adaptor to enable the use of small collets interchangeably with the same pusher sleeve assembly as is used with full size collets.

A still further object of the invention is to provide a novel collet cage having end portions and an inwardly bowed intermediate longitudinally slotted portion. The intermediate portion is preformed to yield uniformly inwardly when compressive forces are applied endwise to the collet, whereby to grip the work, and to expand outwardly approaching the diameter of the end portions of the cage upon the release of such axial compressive forces, whereby to release the work.

Other objects will be more apparent to one skilled in the art upon an examination of the following disclosure:

Figure 1:
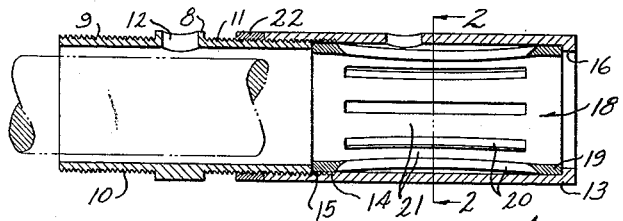
Fig. 1 is an axial cross sectional view of a feed device embodying the invention.
Figure 2:
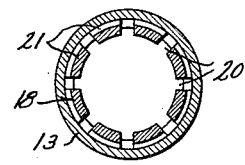
Fig. 2 is a transverse cross sectional view taken along the line 2—2 of Fig. 1.

A feed mechanism of the type about to be described has particular utility in an automatic screw machine or the like which operates on bar stock. After each operation is completed, the work is advanced in order to perform a similar operation upon a newly exposed portion of the unused bar stock. In machines of this character a reciprocable pusher or feed collet, which is lightly clamped in frictional engagement with the work, advances the work the required distance while the work is temporarily released by the chuck which clamps it during the screw machine operation. The feed collet is never disengaged from the work, but merely slides thereupon, the work being re-engaged and held rigidly by the chuck (not shown) during feed collet withdrawal.

This invention provides an improved feed device having a collet whose gripping action upon the work is adjustable by axially compressing the collet so as to resiliently bow intermediate portions of its gripping elements into frictional contact with the work. It is important that regardless of the round or polygonal character of the bar stock and collet, any desired degree of frictional pressure may be exerted on work which is nearly as large in cross section as the pusher sleeve through which it is fed, this result being achieved without increasing the external dimensions of the sleeve.

With particular reference to Figs. 1 to 4, one embodiment of the feed device comprises a pusher sleeve 10 provided with external threads 9 and 11 at each end of the sleeve. A thickened annular central portion 8 of the sleeve is provided with a socket 12 to receive the prong of a spanner wrench or the like. Externally threaded upon the sleeve threads 11 is a tubular housing 13 with internal threads 14. The housing 13 extends axially from the end margin 15 of the sleeve and is provided with a peripheral flange 16 which provides an inner shoulder opposed to the sleeve shoulder 15.

Between the shoulders 16 and 15 a contractile collet or cage indicated generally as 18 is seated. The collet 18 is fabricated from a single tubular piece having end ring portions 19 of continuous wall area and an intermediate portion longitudinally slotted at 20 to define peripherally spaced longitudinally extending gripper strip elements 21.

Figure 4:
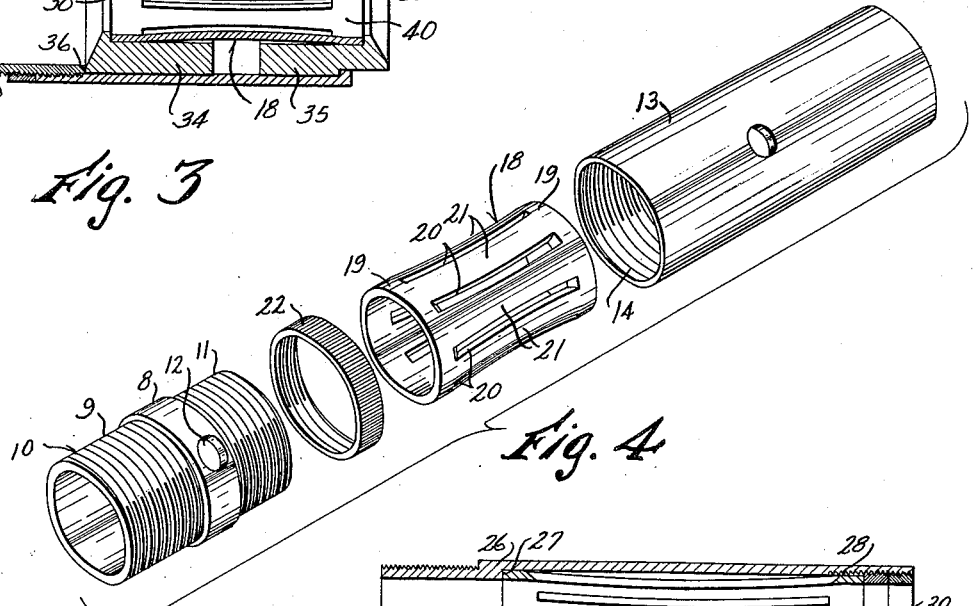
Fig. 4 is a perspective view of the feed device of Fig. 1, the several parts thereof being shown in spaced apart relationship prior to assembly.

After the collet or cage 18 is milled to provide the slots 20, the strips 21 intermediate the slots are bowed or preformed slightly inwardly, as best indicated in Fig. 4, so that the longitudinal gripper elements 21 assume a uniformly inbent or bowed contour to predetermine the direction in which these strips will yield under axial pressure. This inward deformation or lateral offset is of but slight extent, being only sufficient to insure continued inward bowing of the grippers 21 when axial compression forces are exerted on the cage. In this manner the collet 18 is effective to grip work rods having diameters approaching the inner diameter of the cage end portions 19.

By advancing the housing 13 upon the threads 11 of sleeve 10, axially compressing forces are exerted upon the cage 18 between the shoulders 16 and 15 to inwardly bow or spring the grippers 21 to any desired extent within a given range. In this the pressure of the strip on the bar stock may be varied as desired. After desired pressure on the work rod is attained the lock nut 22 is engaged with the housing 13 to secure it in selected position.

Figure 5:
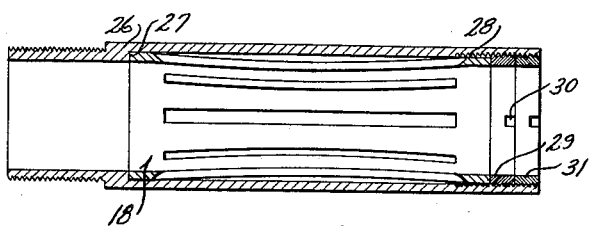
Fig. 5 is an axial cross sectional view of a further modification of the invention.

A somewhat modified form of the feed device is shown in Fig. 5. In this embodiment a pusher sleeve 26 comprises the housing for the collet cage and is provided with an inner annular shoulder 27 near one end, and with internal threads 28 near its other end. An annular externally threaded plug 29 provides a shoulder opposed to shoulder 27, between which shoulders the collet 18 is seated. Axially compressive forces on the collet 18 are exerted by advancing the plug 29 on the sleeve threads by means of a wrench or like tool engaged in the slot 30 of the plug. A locking plug 31 completes the assembly and securely positions the collet in any selected axially compressed condition.

Figure 3:
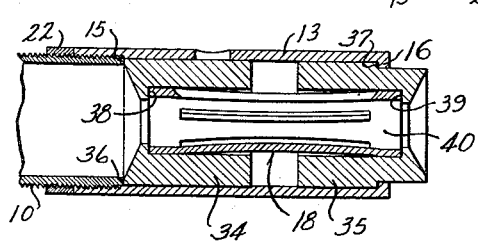
Fig. 3 is an axial cross sectional view of a feed device embodying the invention provided with axially spaced internal inserts or pilots to adapt a collet of reduced diameter to the same pusher sleeve assembly as used in the collet shown in Fig. 1.

Although the contractile collet 18 is adjustable over a substantial range to grip a variety of work pieces, it is desirable to use a smaller size collet for smaller work pieces. For this purpose, as shown in Fig. 3, interchangeable axially spaced adapters 34 and 35 are disposed within the feed device and against the opposed shoulders 16 and 15. The adapters 34 and 35 are respectively provided with outwardly opposed shoulder margins 36 and 37 which seat against the sleeve and housing shoulders 15 and 16, respectively.

The inserts are further provided with inward opposed shoulders 38 and 39 respectively to centrally seat a collet or cage 40 of reduced cross section. Axially compressive forces are transmitted to the cage through the inserts or adapters when the housing 13 is advanced upon the sleeve 10 in the manner aforedescribed. Through the use of these inserts or pilot adapters, it is unnecessary to change the pusher sleeve assembly when the size of work rod is materially changed, it being merely necessary to disassemble the housing from the sleeve to make the desired adaptation.

Figure 6:
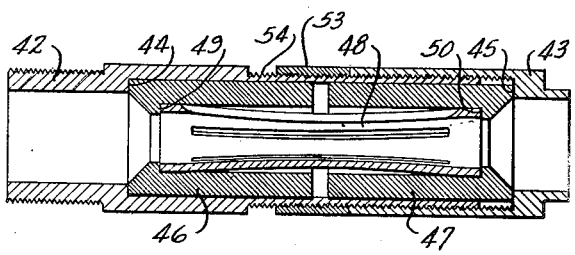
Fig. 6 is an axial cross sectional view of a still further modification of the invention.

A further modification of the invention is illustrated in Fig. 6. In this embodiment the pusher sleeve 42, as in the modification of Fig. 5, provides the cage housing. Sleeve 42 is provided with an internal annular shoulder 44 and end cap 43 provides an annular shoulder 45. Collet 48, if of full size, may be seated between the shoulders 44 and 45, or if of reduced size, may be seated between axially spaced inserts or adapters 46 and 47. The adapters 46 and 47 are provided with opposed annular shoulders 49 and 50 to position the collet. The end cap 43 is threaded on the external threads 54 and is locked in selected position by the lock nut or ring 53.

From the foregoing description taken in connection with the accompanying drawings it is seen that an improved feed mechanism is provided which includes a collet of novel configuration having end rings and an intermediate gripping portion of substantially the same inner diameter when the collet is under little axial compressive force. In this manner a piece of bar stock of substantially the same diameter as the end rings may be accommodated by the collet. In addition the feed device is provided with removably insertable adapters which provide seats or mountings for collets of reduced size.

We claim:

1. A feed device for an axially extending workpiece comprising the combination with a pusher sleeve having a first shoulder and a second shoulder axially spaced from and adjustable respecting said first shoulder, of a contractible collet confined under axial compression between said first and second shoulders, said collet comprising a tubular wall of uniform thickness throughout and having continuous end portions abutting the shoulders and having an intermediate portion longitudinally slotted to define longitudinally extending resilient strips between the slots and constituting grippers, said grippers being uniformly preformed in a shallow axially extending inwardly convex arc to bow inwardly and exert uniform pressure on the workpiece over substantially the entire length of said gripper under axial compression of the collet exerted thereon between said first and second shoulders.

2. The device of claim 1 wherein the second shoulder is provided by a tubular housing externally threaded on said sleeve whereby the axial pressure on the collet is variable.

3. The device of claim 1 wherein the second shoulder is provided by a plug internally threaded on said sleeve, whereby the axial pressure on the collet is variable.

4. The device of claim 1 wherein the collet is of materially smaller diameter than the sleeve, said sleeve being further provided with axially spaced tubular inserts having opposed outer shoulders seated against said first and second shoulders and opposed inner shoulders providing seats for said collet, axial compressive forces being transmitted from the sleeve to said collet through said inserts.

5. A cage-like collet to feed axially extending workpieces formed from a single tubular wall comprising end rings and an intermediate portion having peripherally spaced axially extending slots and alternate peripherally spaced axially extending flexible gripper elements between the slots, said elements having a slight preset inward deformation, whereby axial compression of the collet is effective to bow said gripper elements inwardly and grip the workpiece with uniform pressure over a substantial part of the axial extent of said gripper elements, said end rings and intermediate portion being of uniform thickness throughout, said intermediate portion being inwardly convex throughout its longitudinal extent.

6. In a feed device for axially extending workpieces of the character described, a contractile collet comprising a tubular cage-like member having continuous end rings and a longitudinally slotted intermediate portion, said intermediate portion comprising resilient gripping elements defined by said slots which are inwardly convex throughout their length, said gripping elements having just sufficient convexity to predispose them to bow inwardly upon axial compression of the collet and grip a workpiece with substantially uniform pressure throughout their length, said end rings and intermediate portion being of substantially uniform thickness throughout and said gripping elements being sufficiently resilient to expand outwardly to approach the same diameter as the end rings upon release of said axial compression.

7. In a workpiece feeding device the combination with a pusher sleeve having a threaded portion and an integral shoulder, and an annular member threaded to said threaded portion and providing a second shoulder axially spaced from said first mentioned shoulder and opposed thereto, of a contractible collet disposed between said shoulders to receive compressive force when said member is advanced on said threaded sleeve, said collet comprising a tubular cage-like member having continuous end rings and an axially slotted intermediate portion, said intermediate portion comprising resilient axially extending gripping elements defined by said slots and integral at their ends with said rings, said gripping elements being of resilient material centrally deformed inwardly and inwardly longitudinally convex throughout their length to have substantially uniform pressure contact with the work at all points and so as to bow inwardly upon axial compression of the collet and to expand outwardly to a diameter approaching the diameter of the end rings upon release of said compression, the threaded portion of the sleeve being further provided with a lock member threaded thereto for locking engagement with said second shoulder member.

8. The device of claim 7 wherein the collet is of materially smaller diameter than the sleeve, said sleeve being further provided with axially spaced tubular inserts having opposed outer shoulders seated against said first and second shoulders and opposed inner shoulders providing seats for said collet, axial compression being transmitted from said sleeve to said collet through said inserts.

9. A feed device comprising the combination with a pusher sleeve having opposed shoulder means adjustable as to spacing, of a contractile collet between said shoulders and subject to axial compression therebetween, said collet comprising a tubular wall having end portions abutting the shoulders and intermediate portions comprising axially extending resilient gripper strips, said strips being very slightly inwardly convex longitudinally throughout their work gripping portion whereby to have substantially line contact with the work, and substantially uniform pressure along said line of contact, said end portions and intermediate portions being of uniform thickness throughout whereby said collet may be fabricated from a tube of uniform thickness merely by longitudinally slitting said intermediate portion and deforming it slightly inwardly.

References Cited in the file of this patent

UNITED STATES PATENTS

| Number | Name | Date |
|---|---|---|
| 1,438,021 | Crossley | Dec. 5, 1922 |
| 1,597,404 | Crossley | Aug. 24, 1926 |
| 1,783,039 | Green | Nov. 25, 1930 |
| 1,846,695 | Smith | Feb. 23, 1932 |
| 1,941,999 | Redmer | Jan. 2, 1934 |
| 2,037,304 | Baxendale | Apr. 14, 1936 |
| 2,087,868 | Baxendale | July 20, 1937 |